United States Patent
Kwon et al.

(10) Patent No.: US 7,848,247 B2
(45) Date of Patent: Dec. 7, 2010

(54) SERVICE PROVIDING METHOD BASED ON SERVICE SUBSCRIBER LEVEL ON CABLE NETWORK

(75) Inventors: Eun-Jung Kwon, Daejon (KR);
Joon-Young Jung, Daejon (KR);
O-Hyung Kwon, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1080 days.

(21) Appl. No.: 11/520,942

(22) Filed: Sep. 13, 2006

(65) Prior Publication Data
US 2007/0058677 A1    Mar. 15, 2007

(30) Foreign Application Priority Data
Sep. 14, 2005    (KR) .................. 10-2005-0085905

(51) Int. Cl.
*H04N 7/173* (2006.01)
(52) U.S. Cl. .................. 370/252; 370/465; 370/485; 725/111
(58) Field of Classification Search ............ 1/252, 1/448, 465, 468; 725/1, 111; 370/252, 448, 370/465, 468, 485–487
See application file for complete search history.

(56) References Cited

U.S. PATENT DOCUMENTS

| 6,047,051 | A  | * | 4/2000 | Ginzboorg et al. | 379/130 |
| 6,230,203 | B1 | * | 5/2001 | Koperda et al.   | 709/229 |
| 6,614,799 | B1 | * | 9/2003 | Gummalla et al.  | 370/448 |

OTHER PUBLICATIONS

IEEE Transactions on Broadcasting, Improved Priority Acess, Bandwidth Allocation and Traffic Scheduling for DOCSIS Cable Networks, Wen-Kuang Kuo et al., vol. 49, No. 4, Dec. 2003, pp. 371-382.

* cited by examiner

*Primary Examiner*—Seema S Rao
*Assistant Examiner*—Mon Cheri S Davenport
(74) *Attorney, Agent, or Firm*—Blakely, Sokoloff, Taylor & Zafman LLP

(57) ABSTRACT

Provided is a method for providing a service based on a subscriber level. The method includes the steps of: a) initializing a Data Back-off Start (DBS) value and a Data Back-off End (DBE) value; b) acquiring subscriber information from an external management system; c) acquiring service flow identifier (SFID) and service identifier (SID) information from an object model for quality of service (QoS) based on information on Service Class Name (SCN) of the subscriber acquired in the step b); d) creating manufacturing automation protocol (MAP) according to a priority by grasping the SID information based on the service level and controlling the DBS value and the DBE value of a cable modem (CM); and e) transmitting the created MAP to the cable modem.

7 Claims, 3 Drawing Sheets

SERVICE PROVIDING METHOD BASED ON SERVICE SUBSCRIBER LEVEL ON CABLE NETWORK

FIELD OF THE INVENTION

The present invention relates to a method for providing a service based on a subscriber level by using a Data Over Cable Service Interface Specification (DOCSIS) channel on a cable network; and, more particularly, to a service providing method on a cable network which provides a service based on the service level of a subscriber by creating and transmitting a manufacturing automation protocol (MAP) message based on service level and subscriber information in a headend cable modem termination system (CMTS), e.g., information on a service applied by the subscriber and Service Identifier (SID) used in a cable modem (CM) of the subscriber, in order to prevent transmission delay of data in the cable modem of the subscriber in a high service level and transmission failure when an upstream band of a DOCSIS channel is used.

DESCRIPTION OF RELATED ART

Data Over Cable Service Interface Specification (DOCSIS), which is international technology standards, defines technological standards for a device in a subscriber location and equipment in a cable communication provider headend. When the DOCSIS is adopted, adoption of a data-over-cable service will be accelerated and device within the infrastructure area of a system operator can become compatable.

Meanwhile, a cable modem (CM) of the subscriber communicates with Cable Modem Termination System (CMTS) by sharing an upstream channel to use a service transmitted through a DOCSIS channel of a cable network.

Since the cable modems of the subscribers using the upstream channel use a service by sharing the channel, data collision may occur in data transmission between the cable modems. In the worst case, communication failure such as long time waiting may occur due to continuous data collision. When every subscriber pays the same amount of money and receives same quality of service, a quality based on a characteristic of the service should be guaranteed, and it is not necessary to provide a differentiated service for each subscriber. However, current service providers try to increase their profits and provide diverse types of services based on service level to their subscribers.

For example, there is an A type service which is 5,000 Won more expensive than a basic type service, which is a default service provided when one signs up for a service, and provides a differentiated service to subscribers with a low cutoff rate and no error in communication speed. Subscribers will pay more to receive differentiated services with higher quality than the Basic service. Accordingly, the service provider can increase their profits.

FIG. 1 is a block diagram showing a general cable network service system.

In FIG. 1, a cable modem transmission system (CMTS) 101 includes an upper layer entity 102 of a cable modem termination system, a downstream classifier 103, an upstream classifier 104, a down stream service flow identifier (ID) 105 and a parameter database (DB) for quality of service (QoS) 114.

Also, a cable modem 106 includes an upstream classifier 107, a downstream classifier 108, an upstream service flow ID 109, an upper layer entity 110 of the cable modem and a parameter DB for QoS 114.

The cable modem transmission system 101 and the cable modem 106 are connected to a hybrid fiber coax (HFC) Network 113. The HFC network 113 includes a downstream channel 111 and an upstream channel 112.

Since the cable modem 106 of the subscriber receiving a service through the HFC network 113 shares the upstream channel 112, collision can be generated between data transmitted through the cable modem 106 of the subscribers in usage of the channel. It has a problem that the high QoS cannot be guaranteed when the service of the high QoS is transmitted to the DOCSIS channel.

To solve the problem, a DOCSIS standard introduces a concept of service flows 105 and 109, shares the parameter DB 114 for service quality, which is a set of parameter affecting the QoS according to each service flow, and guarantees the QoS of the packets transmitted between the DOCSIS channels 111 and 112.

In particular, 6 QoS mechanisms are defined based on the characteristic of the service to guarantee the QoS of the upstream data in the DOCSIS standard.

A first is a mechanism of an Unsolicited Grant Service (UGS) that the cable modem transmission system 101 allows a fixed size grant for periodically transmitting a fixed size data to the cable modem 106 to support a real-time service such as an Voice over Internet Protocol (VoIP), and the cable modem transmission system 101 processes all requests related to the service delay.

A second is a UGS-Activity detection (UGS-AD) mechanism used by adding Active Detection algorithm to the UGS concept in the cable modem transmission system 101 to complement the shortcoming of the UGS which wastes a simple band when the service flow is not active.

A third is a real-time polling service (rtPS) mechanism that the cable modem 106 requests a size of required band to the cable modem transmission system 101 according to a condition differently from the UGS, and the cable modem transmission system 101 has each cable modem 106 transmit band grant.

A fourth is a non-real-time polling service mechanism that targets a non-real-time service such as a file transfer protocol (FTP) service and that the cable modem 106 can request a size of the band according to the condition.

Also, there are Best Effort (BE) and Committed Information Rate (CIB) mechanisms.

The mechanisms for guaranteeing the QoS share parameters for determining the QoS based on a characteristic of each service and a packet of each service is transmitted based on service flow.

The above-mentioned service class can guarantee the quality for providing the service itself, but it has a limitation in guarantee of the differentiated QoS based on the user service level.

Definition on service level agreement (SLA) is required to provide the differentiated service based on subscriber level.

The SLA is like a record of information related to charging by the service application of the subscriber defined in Operations Support System Interface Specification (OSSI) of the DOCSIS. Herein, Service Class Name (SCN) is used as major information. The SCN is also used as a major element in an object model for guaranteeing the QoS of the DOCSIS.

As described above, the conventional technology may be able to guarantee the quality on the service characteristic, but it has the limitation in providing differentiated services based on the service level of each subscriber.

In order to overcome the limitation, when the cable modem 106 is registered in the cable modem transmission system 101, a priority value in the inside of register request message of the cable modem 106 is transmitted together and the cable modem transmission system 101 reflects the priority value transmitted from the cable modem 106 in a manufacturing automation protocol (MAP) message. Accordingly, the upstream band can be allocated based on the priority value.

However, the message through the above process requires correction on the DOCSIS standard, and the cable modem transmission system 101 creates and processes a priority queue upon request of the cable modem 106. Therefore, there is a problem that it makes an operation of the process for band allocation of the cable modem transmission system 101 complicated.

SUMMARY OF THE INVENTION

It is, therefore, an object of the present invention to provide a service providing method based on the service level of a subscriber on a cable network which guarantees shorter delay time and smoother data transmission in a contention section than those subscribing a low-level service, when a subscriber of a high-level service uses an upstream channel, based on service application information applied by the subscriber in Service Class Name (SCN) managed in cable modem termination system (CMTS) and a charging system referring to the SCN.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a method for providing a service based on a service level of a subscriber on a cable network, the method including the steps of: a) initializing a Data Back-off Start (DBS) value and a Data Back-off End (DBE) value; b) acquiring subscriber information from an external management system; c) acquiring service flow identifier (SFID) and service identifier (SID) information from an object model for quality of service (QoS) based on information on the SCN of the subscriber acquired in the step b); d) creating manufacturing automation protocol (MAP) according to a priority by grasping the SID information based on the service level and controlling the DBS value and the DBE value of a cable modem (CM); and e) transmitting the created MAP to the cable modem.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
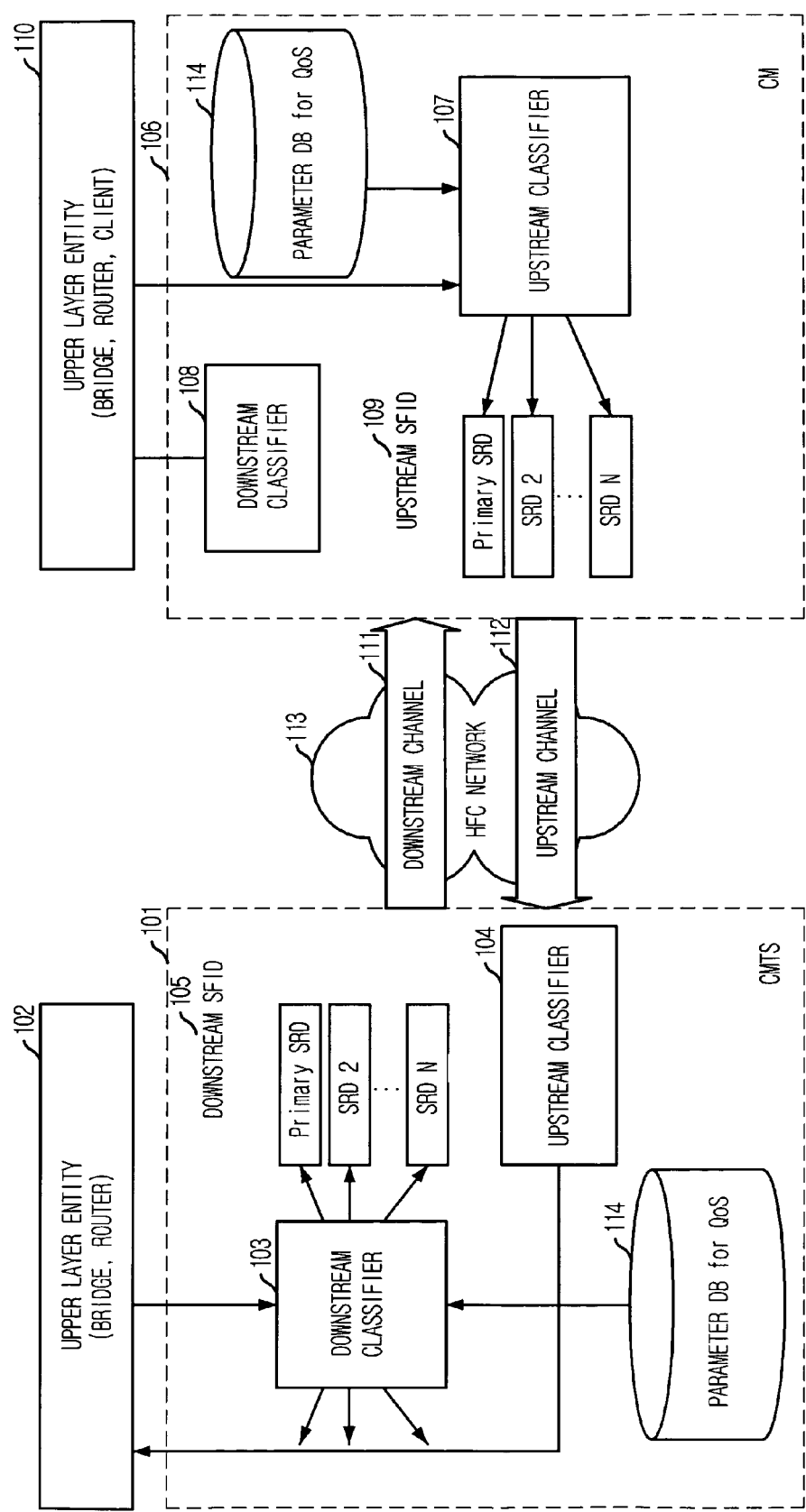
FIG. 1 is a block diagram showing a general cable network service system.
Figure 2:
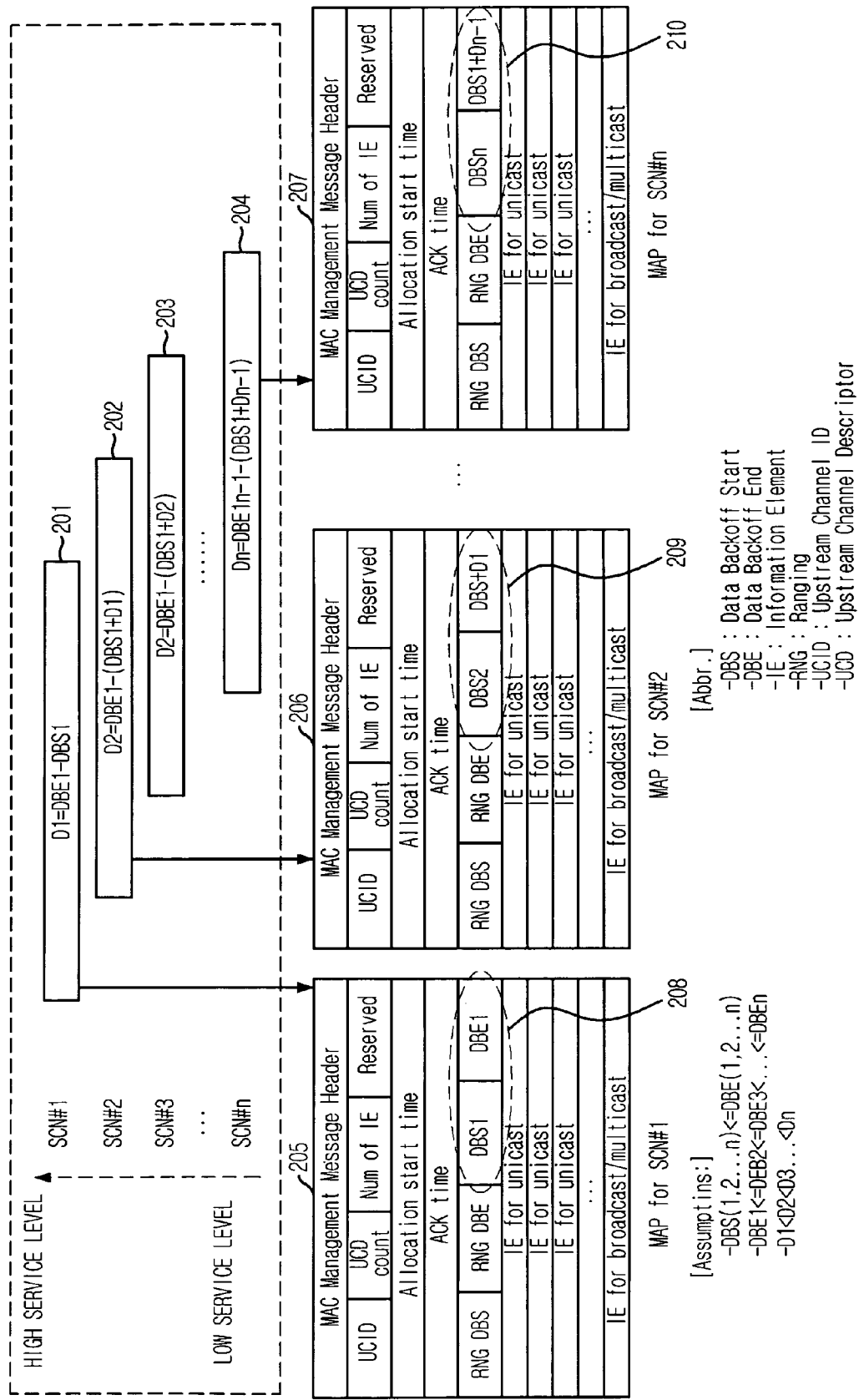
FIG. 2 is a diagram describing a process for creating a Manufacturing Automation Protocol (MAP) message in a service providing method based on a subscriber level on a cable network in accordance with an embodiment of the present invention.

FIG. 2 is a diagram describing a process for creating a Manufacturing Automation Protocol (MAP) message in a service providing method based on a subscriber level on a cable network in accordance with an embodiment of the present invention. It shows a concept of creating the MAP message based on the subscriber level on the cable network satisfying a Data Over Cable Service Interface Specification (DOCSIS) standard.

The service providing method based on the service level of a subscriber, which is suggested in the present invention, includes an upstream band allocation process of a cable modem (CM) based on Service Class Name (SCN) of an object model for a DOCSIS quality of service (QoS), and Operations Support System Interface Specification (OSSI) standard for managing a subscriber network in DOCSIS channels.

In FIG. 2, "201 to 204" are differences between Data Back-off Start (DBS) values and Data Back-off End (DBE) values; "205 to 207" are MAPs for the SCNs; and "208 to 210" are values of the DBE and DBS in MAPs 205 to 207 for the SCN.

The MAPs 205 to 207 for the SCN include information of a Media Access Control (MAC) management message header, upstream channel identifier (UCID), upstream channel descriptor (UCD) counter, the number of information element, allocation start time, ACK time, DBS ranging (RNG DBS), DBE Ranging (RNG DBE), a DBS value, DBE, information element for unicast, and information element for broadcast/multicast.

The cable modem transmission system acquires service application and usage information of a subscriber recorded in an external management system such as a charging system located in a headend of a service provider to acquire the subscriber information based on the service level.

The cable modem transmission system controls a Data Back-Off value of a MAP message through the SCN and service flow managed for the QoS. It will be described in detail hereinafter.

For example, when the cable modem transmits Request-Frame, which is a message for band request, for data transmission to the cable modem transmission system, the cable modem transmission system searches a service flow identifier (SFID) corresponding to a service identifier (SID) and can find the SCN including the SFID. Herein, the cable modem transmission system can acquire information, on which service a cable modem MAC address and subscriber use through the OSSI interface, from the SCN.

Since the cable modem transmission system knows the service level applied by the subscriber through the SCN, a priority of the SID can be determined by inferring the SFID and the SID corresponding to the SCN in allocation of upstream bands.

Meanwhile, a MAP message creating process in the service quality guarantee method based on the subscriber level on the cable network of the present invention is as follows.

A DBS value and a DBE value should be different from each other based on the SCN. The higher the level of the SCN is, the smaller the difference between the DBS value and the DBE value should be.

For example, in FIG. 2, a D1 201, which is a difference between the DBE value and the DBS value in SCN #1 of a high priority, should be smaller than a Dn 204, which is a difference between the DBE value and the DBS value of SCN #N in a low priority. That is, it is based on a principle that the higher the service level is, the smaller the difference between the DBE value and the DBS value should be, and the lower the service level is, the larger the difference between the DBE value and the DBS value should be. This is because cable modems share an upstream channel for communication. Accordingly, when the data are transmitted at a certain point of time, those from one cable modem may collide with those from another cable modem. Herein, "DBS (1,2, ..., n)≦DBE (1,2, ..., n")", "DBE 1≦DBE 2≦ ... ≦DBE", and D1<D2< ... <Dn.

In DOCSIS, a truncated binary exponential back-off (TBEB) algorithm should be operated to communicate through the upstream channel. The TBEB algorithm is used as a collision solution algorithm. The DBS value and the DBE value used in the TBEB algorithm are defined in a MAP message and broadcasted to every cable modem.

When an offset value corresponding to the SID for transmitting the data through the upstream channel is defined, the cable modem receiving the MAP refers to the DBS value and the DBE value defined in the MAP. When the cable modem transmits the data corresponding to the SID to the upstream channel, the cable modem selects a certain value which is larger than the DBS value and smaller than the DBE value.

A difference between the selected value and the DBS value means waiting time before the cable modem transmits the data. That is, the larger the difference between the selected value and the DBS value is, the longer delay time is in transmission of the data to be transmitted to the upstream channel. The cable modem operated by the above principle targets to maximally reduce the collision in usage of the upstream channel and make communication possible.

In the usage of the upstream channel, as described above, the present invention creates the MAP such that transmission time of the cable modem receiving the upstream channel of the higher service level can be minimized, compared to transmission time of the cable modem of the lower service level when the data are transmitted through the upstream.

Figure 3:
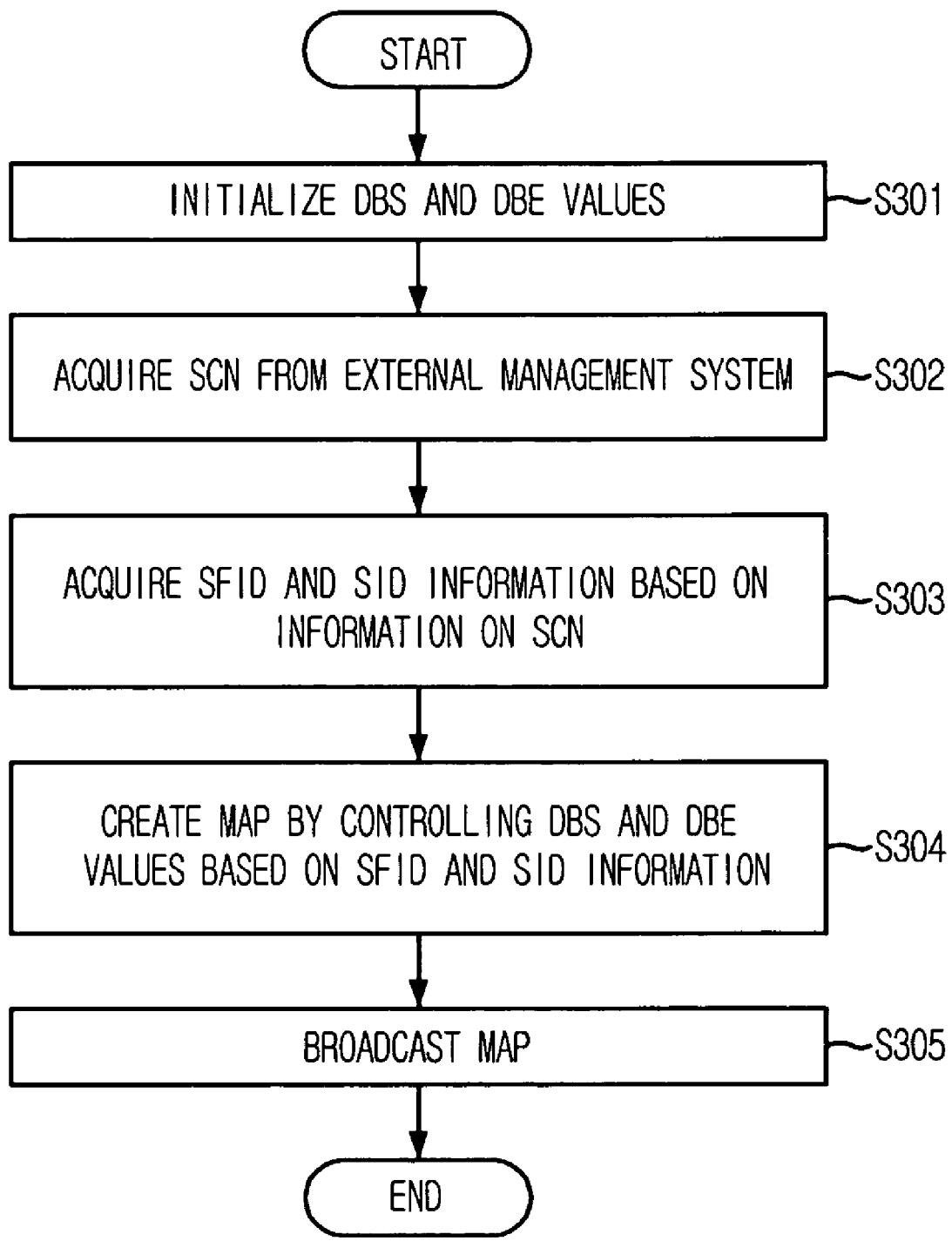
FIG. 3 is a flowchart describing the service providing method based on the subscriber service level on the cable network in accordance with an embodiment of the present invention.

FIG. 3 is a flowchart describing the service providing method based on the subscriber service level on the cable network in accordance with an embodiment of the present invention.

The DBS value and the DBE value are initialized at step S301.

The SCN, which is service application or usage information, is acquired from an external management system such as a charging system for service level information corresponding to the SCN at step S302.

The SFID and SID information are acquired in an object model for the QoS based on the information on the acquired SCN at step S303.

MAP is created based on a priority by grasping the SID information based on the service level and controlling the DBS value and the DBE value of the cable modem at step S304.

The created MAP is transmitted to every cable modem at step S305.

Meanwhile, when the SID value corresponds to the SCN of a low service level, the DBS value is minimized and the DBE value is maximized. Therefore, a difference between the DBS value and the DBE value becomes maximally large, and a difference between delay time for data transmission and the DBS is maximized when the TBEB algorithm is performed in the cable modem. Herein, data transmission rate of the cable modem should not be faster than that of the cable modem receiving the SCN of the high service level.

Also, when the SID value corresponds to the SCN of a high level, the DBS value is maximized under a condition that the DBS value is smaller than or the same as the DBE value, and the DBE value is minimized under a condition that the DBE value is larger than or the same as the DBS value. Subsequently, when the TBEB algorithm is performed in the cable modem, a difference between the delay time for data transmission and the DBS is minimized. Herein, data transmission rate of the cable modem should be faster than the cable modem receiving the SCN of the low service level.

Also, the MAP is created by defining that the SID, which is not included in the lowest or highest level, to minimize the difference between the DBS value and the DBE value based on the service level.

The MAP transmitted through the above process is broadcasted to cable modems.

In the usage of a service between the cable modem transmission system and the cable modem satisfying the DOCSIS standard, a subscriber of the high service level has a higher priority than a subscriber of the low service level. Also, the transmission delay can be minimized in case of the subscriber of the high service level. Accordingly, a service provider can provide a differentiated quality of service to subscribers, and the subscribers can receive the service of guaranteed quality in return as much as they pay.

As described in detail, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent application No. 2005-0085905, filed with the Korean Intellectual Property Office on Sep. 14, 2005, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for providing a service, by a headend cable modem termination system (CMTS), based on a service level of a subscriber at a cable network, comprising the steps of:
    a) initializing a Data Back-off Start (DBS) value and a Data Back-off End (DBE) value of a cable modem (CM);
    b) acquiring subscriber information from an external management system;
    c) acquiring service flow identifier (SFID) information and service identifier (SID) information from an object model for quality of service (QoS) based on information on Service Class Name (SCN) of the subscriber acquired in the step b);

d) creating manufacturing automation protocol (MAP) according to a priority by controlling the DBS value and the DBE value which is determined by checking the SID information based on the service level, wherein when the SID information corresponds to the SCN of a low service level, the difference between the DBS value and the DBE value becomes maximum by minimizing the DBS value and maximizing the DBE value, and when the SID information corresponds to the SCN of a high service level, the DBS value is maximized under a condition that the DBS value is smaller than or the same as the DBE value, and the DBE value is minimized under a condition that the DBE value is larger than or the same as the DBS value; and e) transmitting the created MAP to the cable modem; wherein the DBS value, the DBE value, and a difference are maximized/minimized based on the SID information, the service level, and the SCN.

2. The method as recited in claim 1, wherein in the step b), service application and usage information of the subscriber are acquired from the external management system for service level information corresponding to the SCN.

3. The method as recited in claim 2, wherein the external management system is a charging system.

4. The method as recited in claim 1, wherein when the DBS value and the DBE value correspond to the SCN of a low service level and a truncated binary exponential back-off (TBEB) algorithm is performed in the cable modem, the difference between delay time for data transmission and the DBS is maximized and data transmission rate of the cable modem is not faster than the data transmission rate of a cable modem receiving the SCN of the high service level.

5. The method as recited in claim 4, wherein the DBS value and the DBE value define the SID-information which is not included in the low service level or the high service level, to minimize the difference between the DBS value and the DBE value based on the service level.

6. The method as recited in claim 1, wherein when the DBS value and the DBE value correspond to the SCN of a high service level, the difference between delay time for data transmission and the DBS is minimized and speed for data transmission should be faster in above cable modem than a cable modem receiving the SCN of the low service level.

7. The method as recited in claim 6, wherein the DBS value and the DBE value define the SID which is not included in the low service level or the high service level, to minimize the difference between the DBS value and the DBE value based on the service level.

* * * * *